US012614336B2

(12) United States Patent (10) Patent No.: US 12,614,336 B2

Tobenkin (45) Date of Patent: Apr. 28, 2026

(54) SYSTEMS AND METHODS FOR COLOR CORRECTING THREE-DIMENSIONAL OBJECTS FORMED BY POINT CLOUD DATA POINTS

(71) Applicant: Illuscio, Inc., Culver City, CA (US)

(72) Inventor: Steven A. Tobenkin, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 365 days.

(21) Appl. No.: 18/406,682

(22) Filed: Jan. 8, 2024

(65) Prior Publication Data

US 2024/0394953 A1      Nov. 28, 2024

Related U.S. Application Data

(63) Continuation of application No. 18/324,426, filed on May 26, 2023, now Pat. No. 11,875,447.

(51) Int. Cl.
 *G06T 17/00* (2006.01)
 *G06T 7/90* (2017.01)
 (Continued)

(52) U.S. Cl.
 CPC .............. *G06T 15/04* (2013.01); *G06T 15/50* (2013.01); *G06T 17/00* (2013.01); *G06T 7/90* (2017.01);
 (Continued)

(58) Field of Classification Search
 CPC . G06T 2207/10028; G06T 7/90; G06T 17/00; G06T 19/20; G06T 2219/2012; G06V 10/56; G06V 20/64
 See application file for complete search history.

(56) References Cited

U.S. PATENT DOCUMENTS

| 11,096,261 B1 * | 8/2021 | Monaghan | .............. G06T 15/50 |
| 11,113,875 B1 * | 9/2021 | Monaghan | .............. G06T 17/00 |

(Continued)

FOREIGN PATENT DOCUMENTS

WO      WO-2022170747 A1 *  8/2022  ................ G01J 3/46

OTHER PUBLICATIONS

Olkkonen et al., Color appearance of familiar objects: Effects of object shape, texture, and illumination changes, Journal of Vision 2008, 8(5):13, pp. 1-16, doi: 10.1167/8.5.13.*

*Primary Examiner* — Guillermo M Rivera-Martinez

(74) *Attorney, Agent, or Firm* — Ansari Katiraei LLP; Arman Katiraei; Sadiq Ansari

(57) ABSTRACT

Disclosed is a system and associated methods for color correcting three-dimensional ("3D") objects by leveraging the 3D positional data associated with point cloud data points that form the 3D objects and by adjusting the defined or inherited color values of the data points to account for multiple factors that are derived from the data point 3D positions. The system determines a color variance between the color values of the first set of points and the color values of the second set of points, determines a variance factor based on the positional elements of the second set of points that contributes to the color variance between the points, and adjusts the color variance to a modified color variance based on the variance factor. The system then modifies or color corrects the color values of the second set of points based on the modified color variance.

20 Claims, 7 Drawing Sheets

(51) Int. Cl.
    *G06T 15/04*         (2011.01)
    *G06T 15/50*         (2011.01)
(52) U.S. Cl.
    CPC .............................. *G06T 2200/08* (2013.01);
       *G06T 2207/10028* (2013.01); *G06T 2210/56*
                         (2013.01)

(56) References Cited

U.S. PATENT DOCUMENTS

| | | |
|---|---|---|
| 2013/0181983 A1 | 7/2013 | Kitamura et al. |
| 2019/0156518 A1 | 5/2019 | Mammou et al. |
| 2021/0049828 A1 | 2/2021 | Park et al. |
| 2021/0201577 A1 | 7/2021 | Wang |
| 2021/0227232 A1 | 7/2021 | Oh et al. |
| 2022/0036644 A1 | 2/2022 | Kobayashi et al. |
| 2022/0116659 A1* | 4/2022 | Pesonen .............. H04N 19/176 |
| 2022/0159297 A1 | 5/2022 | Schwarz |
| 2022/0198751 A1* | 6/2022 | Maruyama ............. B33Y 50/00 |

* cited by examiner

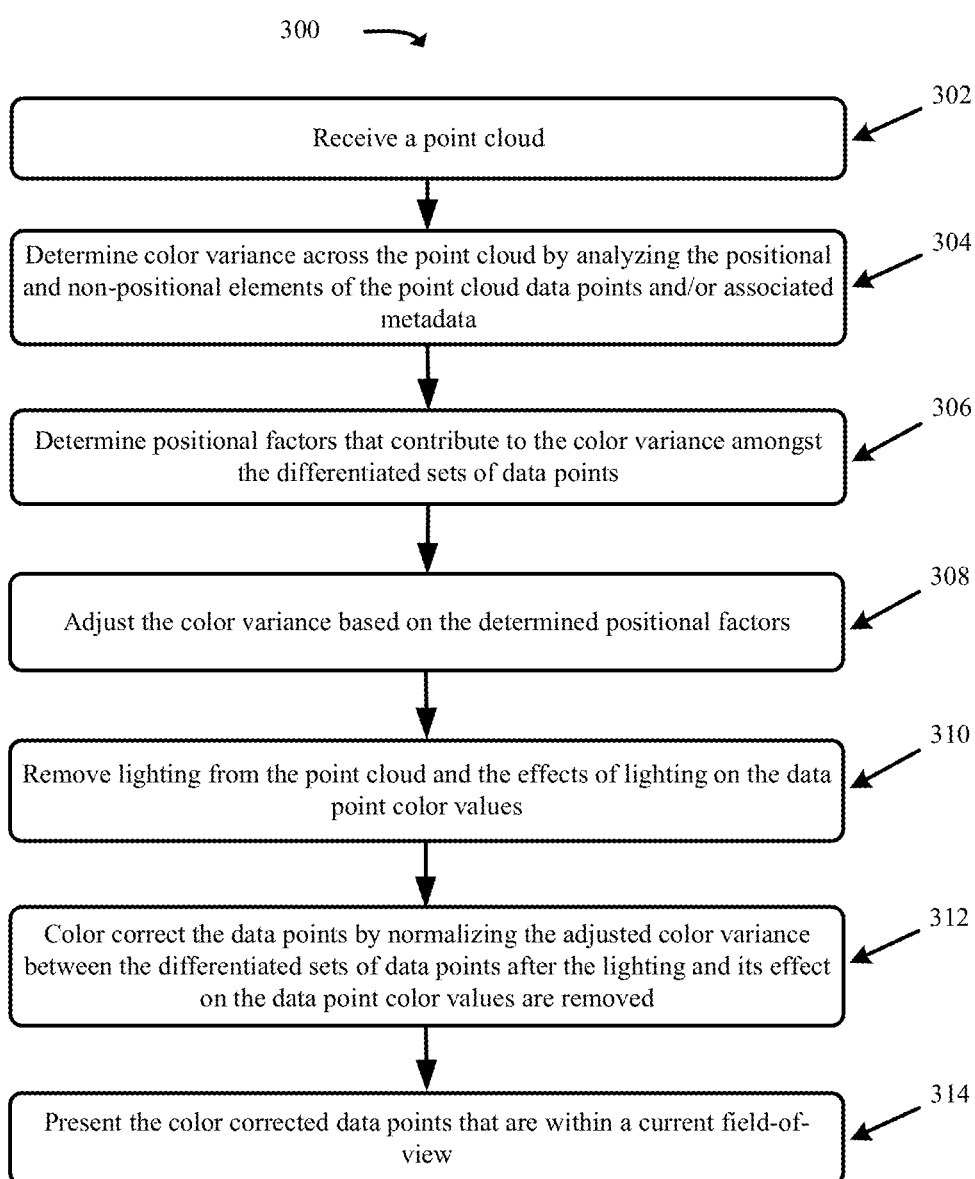

300

Receive a point cloud ⟍ 302

Determine color variance across the point cloud by analyzing the positional and non-positional elements of the point cloud data points and/or associated metadata ⟍ 304

Determine positional factors that contribute to the color variance amongst the differentiated sets of data points ⟍ 306

Adjust the color variance based on the determined positional factors ⟍ 308

Remove lighting from the point cloud and the effects of lighting on the data point color values ⟍ 310

Color correct the data points by normalizing the adjusted color variance between the differentiated sets of data points after the lighting and its effect on the data point color values are removed ⟍ 312

Present the color corrected data points that are within a current field-of-view ⟍ 314

FIG. 3

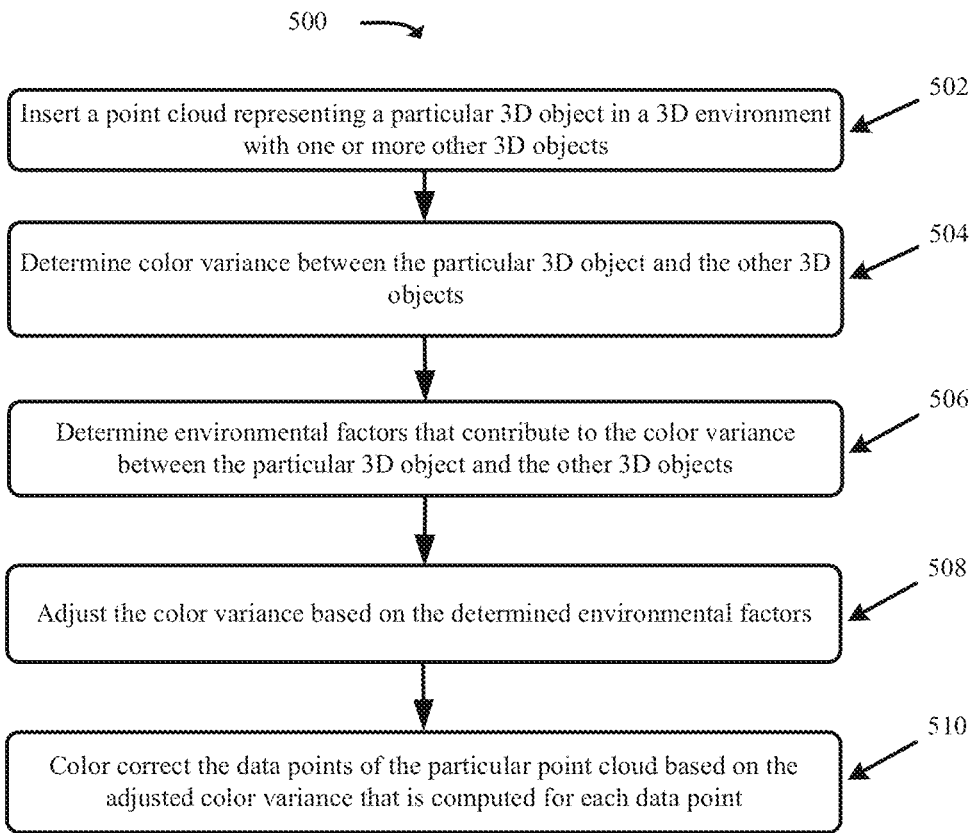

500

Insert a point cloud representing a particular 3D object in a 3D environment with one or more other 3D objects    502

Determine color variance between the particular 3D object and the other 3D objects    504

Determine environmental factors that contribute to the color variance between the particular 3D object and the other 3D objects    506

Adjust the color variance based on the determined environmental factors    508

Color correct the data points of the particular point cloud based on the adjusted color variance that is computed for each data point    510

SYSTEMS AND METHODS FOR COLOR CORRECTING THREE-DIMENSIONAL OBJECTS FORMED BY POINT CLOUD DATA POINTS

CLAIM OF BENEFIT TO RELATED APPLICATIONS

This application is a continuation of U.S. nonprovisional application Ser. No. 18/324,426 with the title "Systems and Methods for Color Correcting Three-Dimensional Objects Formed by Point Cloud Data Points", filed May 26, 2023. The contents of application Ser. No. 18/324,426 are hereby incorporated by reference.

BACKGROUND

Three-dimensional ("3D") models of physical objects may be generated by taking images of the physical objects from different sides, angles, or perspectives. The images collectively capture a physical object from all sides or views. Photogrammetry or other techniques may be used to composite the images and to generate the 3D model or 3D object representation of the physical object.

Differences in the amount or characteristics of light that reaches different sides or positions of the physical object when the physical object is being imaged may cause the same colors at the different sides or positions to be captured with some variance. For instance, the same colors may be represented or captured with different brightness, contrast, saturation, highlights, lowlights, and/or other differences that make the same colors vary in the different images. Shadows, reflections, and other factors may further contribute to the different capture of the same color at different sides or positions of the physical object, and may introduce additional variance in how the same colors are presented on the 3D object. Accordingly, when the 3D model is viewed from a front side with coloring from a first image, the 3D model may appear to have different colors than when the 3D model is viewed from another side with coloring from a second image even though the colors should be the same.

The same issues apply when creating 3D objects without referencing physical objects. An artist may apply the same color to different parts of the 3D object, and may not account for the amount of light that reaches different parts or sides of the 3D object or some parts or sides casting shadows or reflections on other parts or sides. Consequently, the uniform color applied to the different parts or sides of the 3D object may produce an inaccurate or unrealistic visualization when rendering the 3D object from the different sides.

BRIEF DESCRIPTION OF THE DRAWINGS

FIG. 3 presents a process for automatically color correcting a point cloud in accordance with some embodiments presented herein.

FIG. 5 presents a process for color correcting a 3D object that is introduced into a 3D environment in accordance with some embodiments presented herein.

DETAILED DESCRIPTION OF PREFERRED EMBODIMENTS

The following detailed description refers to the accompanying drawings. The same reference numbers in different drawings may identify the same or similar elements.

Provided are systems and methods for color correcting three-dimensional ("3D") objects formed by point cloud data points by leveraging the 3D positional data associated with the point cloud data points. The automated color correction involves analyzing the positioning of the data points that form different parts or sides of the 3D object to determine the different amounts of light, shadows, reflections, and/or other factors that the data points are exposed to from their respective and relative positions, and determining the impact that these factors have on the color values of the data points. The automated color correction further involves normalizing the data point color values based on the analysis. Specifically, the automated color correction includes adjusting the data point color values based on their respective exposure to light, shadows, reflections, and/or other factors. In other words, the automated color correction adjusts the defined or inherited color values to account for multiple factors that are derived from the data point 3D positions and that introduce a sense of realism or realistic color changes to the data points at different positions or distances about the 3D object.

The adjusted color values improve the color accuracy of a 3D object that is generated from multiple images taken from different positions. Specifically, the color correction balances the same colors that may be captured differently in different images of a physical object due to different lighting conditions, shadows, or reflections affecting one part or side of the physical object but not other parts or sides.

Additionally, the color correction adjusts the data point colors to account for the different amounts or characteristics of light, shadows, reflections, and/or other factors that the data points are exposed to. For instance, the color correction introduces measured variance to the color values based on the 3D position of each data point and how light, shadows, reflections, and/or other factors are affected at the 3D position of the data point and the 3D positions of other surrounding or nearby data points. The color correction thereby imparts realistic, artistic, and/or other effects to the data point color values when viewed in any lighting condition or from any angle without the user having to manually define highlight, lowlights, shading, and/or other variations.

Figure 1:
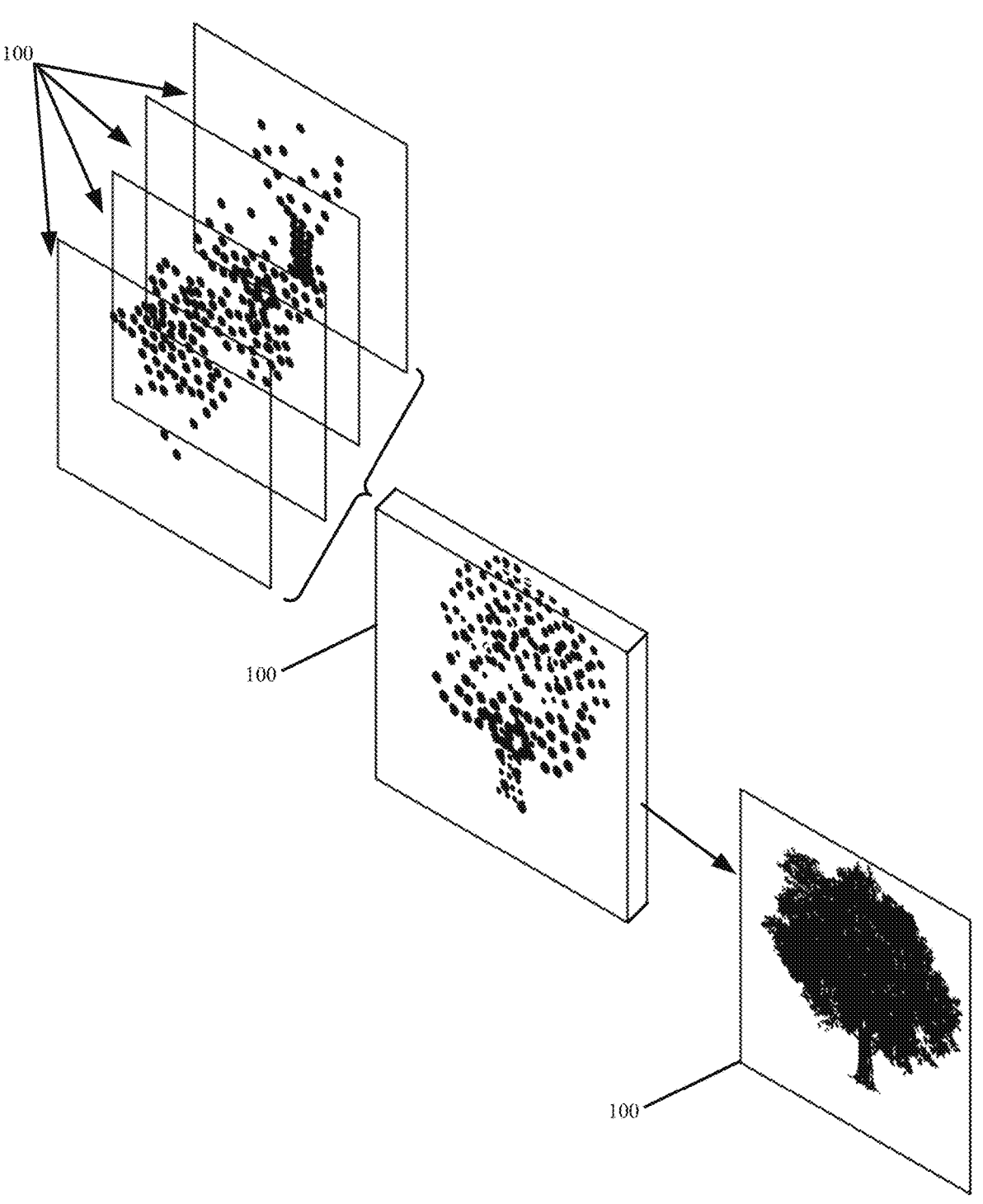
FIG. 1 illustrates an example point cloud that forms a three-dimensional ("3D") object with a defined set of data points in accordance with some embodiments presented herein.

FIG. 1 illustrates an example point cloud 100 that forms a 3D object with a defined set of data points in accordance with some embodiments presented herein. The data points of point cloud 100 differ from pixels of a two-dimensional ("2D") image, because certain regions of point cloud 100 have no data points, lower densities of data points, and/or higher densities of data points based on varying amounts of visual information that is detected, scanned, or created at those regions. Additionally, the position of the point cloud data points are defined in 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image has pixel data for each pixel of a defined resolution (e.g., 640×480, 800×600, etc.).

Each point cloud data point is defined with a plurality of elements. The plurality of elements includes a first set of positional elements and a second set of non-positional or descriptive elements. Values for the positional elements and/or non-positional elements of a particular point may be calculated from the return intensity of the light, laser, or signal reflecting off that particular point and returning to the scanning device.

The positional elements include coordinates within a 3D space. For instance, each point cloud data point includes x-coordinate, y-coordinate, and z-coordinate elements to capture the position of a corresponding physical point from a surface, feature, or object. The positional elements further include a surface normal. The surface normal defines the angle, direction, or orientation that the surface, feature, or object represented by the data point faces or is exposed to. More specifically, the surface normal is a line, ray, or vector that is perpendicular to the scanned surface, feature, or object represented by the data point. In some embodiments, the positional elements may be defined for created data points.

The non-positional elements include information about the detected characteristics of the surface, feature, or object at a corresponding position in the scanned scene. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional elements store other measured or derived characteristics including the chrominance, hardness, translucence, reflectivity, luminance, metallic characteristics, roughness, specular, diffuse, albedo, index of refraction ("IOR"), and/or other properties from the imaged or created surface, feature, or object. In some embodiments, the non-positional elements directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic". These material properties may be associated with different values for the chrominance, hardness, translucence, reflectivity, luminance, and/or other visual characteristics of the data point defined with a material property.

Each point cloud data point of the point cloud includes an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

The data points of point cloud 100 may have inaccurate or inconsistent color values when the color values are mapped from pixels of multiple 2D images that capture the modeled 3D object from different sides, angles, or perspectives. In some embodiments, one or more imaging devices capture a physical object from multiple sides or positions, and a photogrammetry or other 3D modeling technique is used to determine the 3D form of the physical object and/or to define the positional elements of the point cloud data points based on distortion or variation in the same surface, feature, or object part being captured in the different 2D images. In some other embodiments, the positional elements of the data points may be defined based on measurements taken by a LIDAR sensor or another scanner, and the color values are separately mapped to the data points based on a determined alignment between the data point positions and pixels representing the same surface, feature, or object part in the 2D images. In either case, the color values from the pixels of the different 2D images are assigned to the non-positional elements of the data points that form the same 3D object.

Since the 2D images capture the object from different positions, the camera or imaging sensor may be exposed to different lighting conditions that change how color is captured off the object at each position. Also, the different parts or sides of the object are exposed to different amounts of light, shadows, reflections, and/or other factors that may cause the same color to be captured and represented by a different set of color values.

Figure 2:
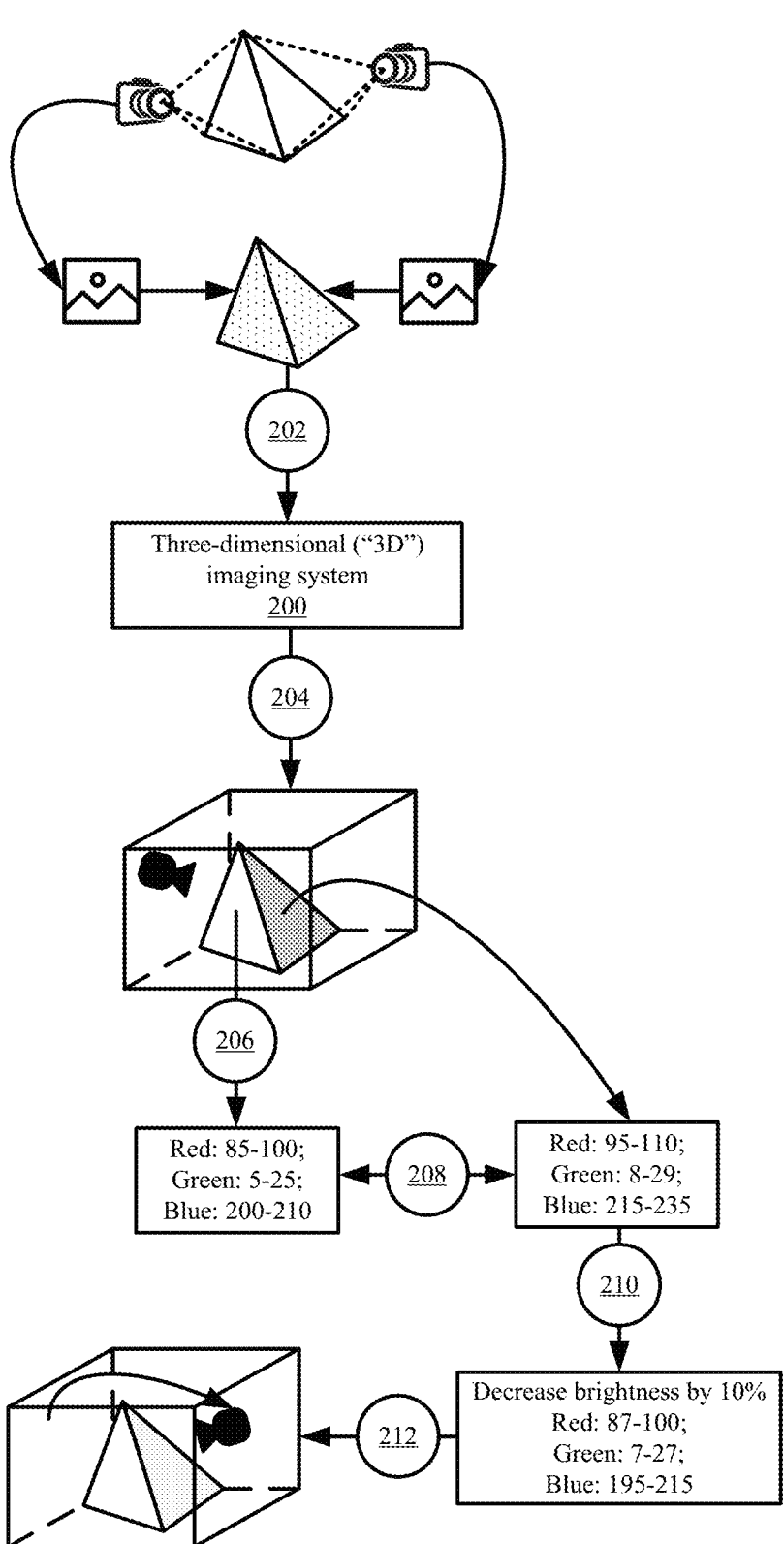
FIG. 2 illustrates an example of color correcting a point cloud in accordance with some embodiments.

Therefore, the color values or range of colors associated with data points at different parts or sides of point cloud 100 may have significant variance because the color values are mapped from the different 2D images that are exposed to different lighting condition and capture different parts or sides of the object that are exposed to different amounts of light, shadows, reflections, and/or other factors. For instance, a front view of point cloud 100 may include mapped color values from a first 2D image that are in a first range, whereas a side view of point cloud 100 may include mapped colors from a second 2D image that are in a second range despite the surfaces of the physical object represented in the front view and the side view having the same colors or the first image and the second image capturing the same surface of the physical object from the different positions FIG. 2 illustrates an example of color correcting a point cloud in accordance with some embodiments. 3D imaging system 200 receives (at 202) a point cloud that is defined with different sets of data points that have color values mapped from different 2D images. The different sets of data points form different sides or parts of a 3D object.

3D imaging system 200 renders (at 204) the 3D object from an initial camera position. The initial camera position sets the field-of-view and the position and angle from which the 3D object is rendered.

3D imaging system 200 selects (at 206) the color values or non-positional elements of a first set of data points in the field-of-view defined by the initial camera position as reference color values. 3D imaging system 200 uses the reference color values to color correct the color values of neighboring sets of data points that were mapped from pixels of a different image than the pixels of the image mapped to the first set of data points.

3D imaging system 200 compares (at 208) the color values (e.g., reference color values) of the first set of data points to color values of the neighboring sets of data points, and determines if the color values change by more than a threshold amount. Specifically, 3D imaging system 200 compares (at 208) like color values between the different sets of data points or related color values in the same range. For instance, 3D imaging system 200 identifies a data point of the first set of data points that has a particular RGB value, and identifies data points in the neighboring sets of data points that have RGB values within the threshold amount of the particular RGB value and that represent a common color that may have deviated from the particular RGB value because the color values were mapped from a separate image than the color values for the data points of the first set of data points.

In some embodiments, the data points may be tagged or may include metadata that specifies which of the multiple 2D images was used to define the color values of the data points. In some such embodiments, the comparison (at 208) may be performed between sets of data points whose color values are assigned or derived from different images. For instance, if the RGB color values in the first set of data points are mapped from a first image, the RGB color values in a neighboring second set of data points are mapped from a second image, and the RGB color values of the first set of data points differ by more than 10% from the RGB color values of the second set of data points, then 3D imaging system 200 color corrects the second set of data points. The comparison (at 208) identifies that the RGB values of the neighboring second set of data points differs by more than the threshold amount from the RGB values of the first set of data points, and creates discontinuity in the visualization of the 3D object as a result of the color variation. Specifically, the 3D object does not appear as one seamless or continuous 3D model because of the color variation that results from mapping the color values from the different 2D images to the different sides or parts of the 3D object.

3D imaging system 200 color corrects (at 210) the color values of the neighboring sets of data points according to the reference colors defined from the color values of the first set of data points. In some embodiments, color correcting (at 210) the color values of the neighboring sets of data points includes normalizing the color values to the reference colors. 3D imaging system 200 computes the variance between the reference colors (e.g., the color values of the first set of data points in the initial field-of-view) and the related color values (e.g., the color values in range of the reference colors) of each set of data points that was mapped from a different image. Computing the variance includes quantifying different lighting conditions, shadows, reflections, and/or factors that produced shifts in the color values assigned to the first set of data points and the neighboring sets of data points, and dynamically adjusting the color values of the neighboring sets of data points based on the quantified factors. For instance, 3D imaging system 200 may compare the color values of the first set of data points that are mapped from a first image to the color values of a neighboring second set of data points that are mapped from a second image, and determine that the color values of the neighboring set of data points or the second image were overall 10% brighter than the color values of the first set of data points or the first image due to different lighting conditions or shadows affecting the capture of the first and second images. Accordingly, 3D imaging system 200 color corrects (at 210) the color values for the second set of data points by adjusting the brightness to match the brightness associated with the reference colors of the first set of data points.

In some embodiments, 3D imaging system 200 performs the color correction (at 210) for the neighboring sets of data points once the initial camera position is determined. In some other embodiments, 3D imaging system 200 performs the color correction (at 210) dynamically as the camera position moves off the first set of data points to a second set of data points. In some such embodiments, 3D imaging system 200 color corrects (at 210) the second set of data points prior to rendering the second set of data points. In any case, the color correction (at 210) ensures that the 3D object represented by the point cloud data points is presented with seamless and continuous colors even when the colors that are mapped from different 2D images to different sets of data points for different parts or sides of the 3D object have noticeable variance or discontinuity between them. As shown in FIG. 2, 3D imaging system 200 renders (at 212) the second set of data points with the adjusted or color corrected color values once the camera position and/or field-of-view is moved to present the side or part of the 3D object represented by the second set of data points.

The initial camera position and/or the selected first set of data points may be predefined or set in the point cloud to ensure that the visualization of the 3D object remains consistent and the color correction that is applied to the data points does not change between different viewings of the 3D object. For instance, if the field-of-view is initially set on the first set of data points, then the color correction is performed using the color values of the first set of data points as the reference colors and the color values of other data points are adjusted or normalized relative to the color values of the first set of data points. However, if the field-of-view is initially set on the second set of data points, then the color correction is performed using the color values of the second set of data points as the reference colors and the color values of other data points are adjusted or normalized relative to the color values of the second set of data points.

Accordingly, 3D imaging system 200 may perform the color correction dynamically at the time the point cloud is viewed or accessed, or when the point cloud is generated. In some instances, the color correction may be performed when generating the point cloud and also when rendering the point cloud. For instance, 3D imaging system 200 color corrects the point cloud to ensure uniform or consistent coloring across the 3D object, and color corrects the point cloud a second time when it is placed in a scene with other 3D objects to adjust the coloring relative to reflections or shadows cast from the other 3D objects or relative to colors of an added background.

In some embodiments, 3D imaging system 200 performs a pre-analysis of the point cloud to determine variance across the point cloud data points, and color corrects the entire point cloud (e.g., adjusts the non-positional elements of the point cloud data points) or specific parts of the point cloud based on the pre-analysis to ensure a consistent visualization of the modeled 3D object regardless of the initial camera position or field-of-view from which the 3D object is first viewed. For instance, 3D imaging system 200 performs the color correction once the positional and non-positional elements of the point cloud data points are defined or generated from the multiple 2D images.

FIG. 3 presents a process 300 for automatically color correcting a point cloud in accordance with some embodiments presented herein. Process 300 is implemented by 3D imaging system 200. 3D imaging system 200 includes one or more devices or machines with processor, memory, storage, network, and/or other hardware resources for generating, editing, viewing, rendering, and/or performing other interactions with 3D objects and/or 3D models encoded or defined as point clouds. Accordingly, 3D imaging system 200 may be a specialized computing system with specialized resources including Graphical Processing Units ("GPUs") that accelerate the processing of the vast amounts of data associated with point cloud having millions or billions of data points.

Process 300 includes receiving (at 302) a point cloud. The point cloud is defined with data points that are distributed in a 3D space and that collectively represent or form a 3D model of one or more 3D objects. The data points are defined with positional elements that define the form and/or structure of the one or more 3D objects. The positional elements of each data point may include x, y, and z coordinates and, optionally, a surface normal. The data points are also defined with non-positional elements that define the visual characteristics of the one or more 3D objects. The non-positional elements of each data point may include RGB color, transparency, reflectivity, and/or other values that affect the visualization of the data point.

In some embodiments, the point cloud or the data points are defined with metadata. The metadata may specify the specific pixel and/or specific 2D image that was used to define the non-positional elements of a data point. The metadata may also specify the exposure settings and/or values entered in the metadata of the specific 2D image that was used to define the non-positional elements of a data point. For instance, the exposure settings specify the aperture, F-stop, shutter speed, and/or other values that were used to capture the associated image. The exposure settings may also include light measurements, white balance, exposure compensation, and/or other values that indicate or may be used to derive the lighting conditions at the time an image is captured.

Process 300 includes determining (at 304) color variance across the point cloud by analyzing the data point positional and non-positional elements and/or the associated point metadata. Determining (at 304) the color variance includes comparing the color values, determining specific ranges of color values found amongst different sets of data points in different regions of the point cloud, differentiating the different sets of data points based on the differing ranges of color values, and/or quantifying the differences in color values between the differentiated sets of data points. Specifically, 3D imaging system 200 analyzes the point cloud data points to identify sets of data points that are defined with similar but consistently offset colors in different parts or regions of the point cloud. For instance, a first set of data points in a first region may have RGB color values that are in a first range, and a second set of data points in a second region may have RGB color values that are in a second range and that are consistently offset from the first range by the same amount or by a threshold percent or amount. In other words, the same RGB color value may not be found in the first and second sets of data points. However, the RGB color values in the first set of data points may consistently be found with a 5-15% increase in the red color component, a 10-17% decrease in the blue color component, and/or green color components that are in range of the green color components of the first set of data points.

3D imaging system 200 may use the metadata to assist in the color variance determination and/or data point analysis. For instance, 3D imaging system 200 may use the metadata to identify different sets of data points whose color values were defined from pixels of different 2D images. 3D imaging system 200 may compare the color values of the different sets of data points against one another to determine (at 304) the color variance between the color values mapped from the different 2D images.

In some other embodiments, 3D imaging system 200 may use the metadata to identify and retrieve the 2D images. 3D imaging system 200 may compare the 2D images against one another to determine brightness, contrast, saturation, hue, highlight, lowlight, intensity, color value, and/or other differences between the images and to quantify the difference. 3D imaging system 200 may then attribute the quantified differences from a particular 2D image to the set of data points that have color values mapped from the particular 2D image. For instance, 3D imaging system 200 may compare a first image to a second image. The color values of the first image and second were mapped to different sets of data points. 3D imaging system 200 may determine that the second image is 10% brighter overall than the first image possibly due to different lighting conditions, different camera lens or imaging sensors that capture more light, or shadows cast on the 3D object part or side captured in the first image but not on the 3D object part or side captured in the second image. 3D imaging system 200 may then determine (at 304) that a second set of data points with color values mapped from the second image have a 10% brightness variance with a first set of data points with color values mapped from the first image. 3D imaging system 200 may convert the 10% brightness variance to an adjustment of RGB color values. For instance, the 10% brightness adjustment may be converted to an 10% increase in the red color component, a 7% increase in the green color component, and a 5% decrease in the blue color component.

Process 300 includes determining (at 306) positional factors that contribute to the color variance amongst the differentiated sets of data points. Determining (at 306) the positional factors includes analyzing the data point positional elements in order to calculate the amount of light each data point is exposed to. For instance, a first subset of data points may be positioned over or around a second subset of data points, thereby reducing the amount of light that reaches the second subset of data points and causing the color values of the second subset of data points to be darker or less saturated as compared to the color values of the first subset of data points. Similarly, a third subset of data points may cast a shadow over a fourth subset of data points from afar, and thereby contribute to the color variance of the fourth subset of data points. As another example, a first data point may have a first surface normal pointing towards the bottom of the 3D object and a second data point may have a second surface normal pointing laterally away from the 3D object, with the first surface normal causing the first data point to receive a percentage amount of less light than the second surface normal of the second data point.

Process 300 includes adjusting (at 308) the color variance based on the determined positional factors. For instance, a first region or a first subset of data points that is exposed to less light than a second region or a second subset of data points is expected to have darker color values than the second region or second subset of data points. Accordingly, 3D imaging system 200 adjusts (at 308) the color variance associated with the first region or the first subset of data points to account for the reduced light exposure. 3D imaging system 200 also adjusts (at 308) the color variance associated with regions or subsets of data points that are partially or wholly obscured by other data points, have surface normals facing away from a light source, are in a shadow cast by other data points, receive reflections off reflective surfaces or data points defined with reflective non-positional elements or material properties, and/or otherwise have their color affected because of their positioning in the point cloud. If a point cloud includes data points that represent or form multiple objects, the color correction accounts for the reflections, shadows, and/or other lighting effects that neighboring objects cast on one another.

Adjusting (at 308) the color variance includes accounting or determining an expected amount of variance between different sets of data points based on their 3D positioning about the 3D object that the data points collectively represent or form. For instance, 3D imaging system 200 may have determined (at 304) that a first set of data points and a second set of data points have a 15% variance in color values, and determines that the positioning of the second set of data points is responsible for an expected 10% variance in color values. Accordingly, 3D imaging system 200 adjusts (at 308) the color variance between the first set of data points and the second set of data points by 5% after accounting for the positional factors and quantifying the impact that the positional factors have on the color values of the first and seconds sets of data points.

Process 300 includes removing (at 310) lighting from the point cloud and the effects of lighting on the data point color values. In some embodiments, 3D imaging system 200 applies a tone curve or other algorithm to remove the lighting and the effects of lighting on the data point color values. In some embodiments, the light properties (e.g., light position, type, intensity, etc.) are defined as part of the metadata. In some other embodiments, 3D imaging system 200 calculates the light properties based on the adjusted (at 308) color variance detected at different parts or regions of the point cloud. Calculating the light properties may include analyzing the adjusted (at 308) color variance to determine the position of one or more light sources, the types of light emitted from each source (e.g., spot, ambient, point, area, directional, volume, etc.), intensity of the emitted light, light color or temperature, etc. Removing (at 310) the lighting includes flattening the highlights, lowlights, intensity, saturation, brightness, and/or color values to obtain the base or reference color values unaffected by light. In some embodiments, removing (at 310) the lighting includes comparing the original 2D images that contributed to the color values of the point cloud data points, determining the positioning, types, and various light properties based on the comparison, and adjusting the data point color values based on the determined positioning, types, and various light properties.

Process 300 includes color correcting (at 312) the data points by normalizing the adjusted color variance between the differentiated sets of data points after the lighting and its effect on the data point color values are removed (at 310). In some embodiments, normalizing the adjusted color variance includes identifying data points whose color values were least impacted by the positional factors and/or removal of lighting, defining the color values of those data points as reference or base values, and adjusting the color values of other data points to the reference or base values. In some other embodiments, normalizing the adjusted color variance includes determining that after considering the positional factors and removing the lighting effects associated with the lighting affecting the original 2D images, a second set of data points have color values that are 10% less saturated or have less contrast as compared to the color values of a first set of data points. Accordingly, 3D imaging system 200 increases the saturation or contrast level of the second set of data points by 10% to eliminate the adjusted color variance while retaining an expected variance between the different sets of data points that is caused by the different positional factors affecting each set of data points and that was previously accounted for when adjusting (at 308) the color variance based on the determined positional factors. In some embodiments, 3D imaging system 200 performs the color correction (at 312) by reintroducing one or more light source to present the color corrected color values of the point cloud data points with the applied light rather than the original light conditions that were present when the different 2D images were captured.

Color correcting (at 312) the data points has the added benefit of automatically removing noise or artifacts from the point cloud. For instance, specks of dust on the camera lens may cause certain pixels of the 2D image to have anomalous color values that are mapped to certain point cloud data points. The data points with the anomalous color values will have significant color variance from the surrounding data points, and the color correction (at 312) will eliminate the color variance and prescribe color values to the data points that are balanced relative to the color values of the surrounding data points, thereby removing the noise or anomalous color values from the point cloud.

In some embodiments, 3D imaging system 200 stores the corrected color values separate from the original non-positional elements of the data points to preserve the original point cloud definition. In some such embodiments, 3D imaging system 200 may define a second set of color corrected non-positional elements to store alongside a first set of original non-positional elements for each data point. In some other embodiments, 3D imaging system 200 stores the adjusted color corrected values to the original non-positional elements of the data points with an edit history file that tracks the color corrections that were applied to different sets of data points (e.g., increase brightness of a first set of data points by 10%, decrease highlights of a second set of data points by 5%, increase the green color component of a third set of data points by a particular value, etc.).

Process 300 includes presenting (at 314) the color corrected data points that are within a current field-of-view. The current field-of-view is defined by a camera position within the point cloud and defines which parts or side of the 3D object represented by the point cloud to render.

Although process 300 describes performing the color correction relative to the entirety of the point cloud, process 300 may be selectively performed on specific regions of the point cloud where the color correction is desired or appears unbalanced. In some embodiments, a user may provide input to designate a subset of regions from the point cloud for color correction. In some other embodiments, 3D image system 200 automatically selects the subset of regions by determining that the colors in the subset of regions unexpectedly differ from the colors in other regions. For instance, the point cloud may be generated from a plurality of images. All the images except for one may have been taken with the same exposure settings or at the same time under similar lighting condition. The deviating image may have been taken at a later time due to an incorrect capture of one side of the imaged object. In this case, 3D imaging system 200 determines that the one image differs from the other images, identifies the set of data points that were generated using the color values of that image, and color corrects that set of data points without color correcting the other point cloud data points.

Once the color values of the data points have been corrected relative to each other, a user may apply color grading adjustments to customize the color values at different parts of the point cloud. For instance, 3D imaging system 200 provides a set of editing tools with which the user may manually introduce artistic effects or variations to the point cloud data points. In some embodiments, the color grading may change the overall color palette (e.g., shift the color range), add sparkles or specular highlights, accent or de-emphasize different parts of the point cloud, and/or correct technical errors.

Figure 4:
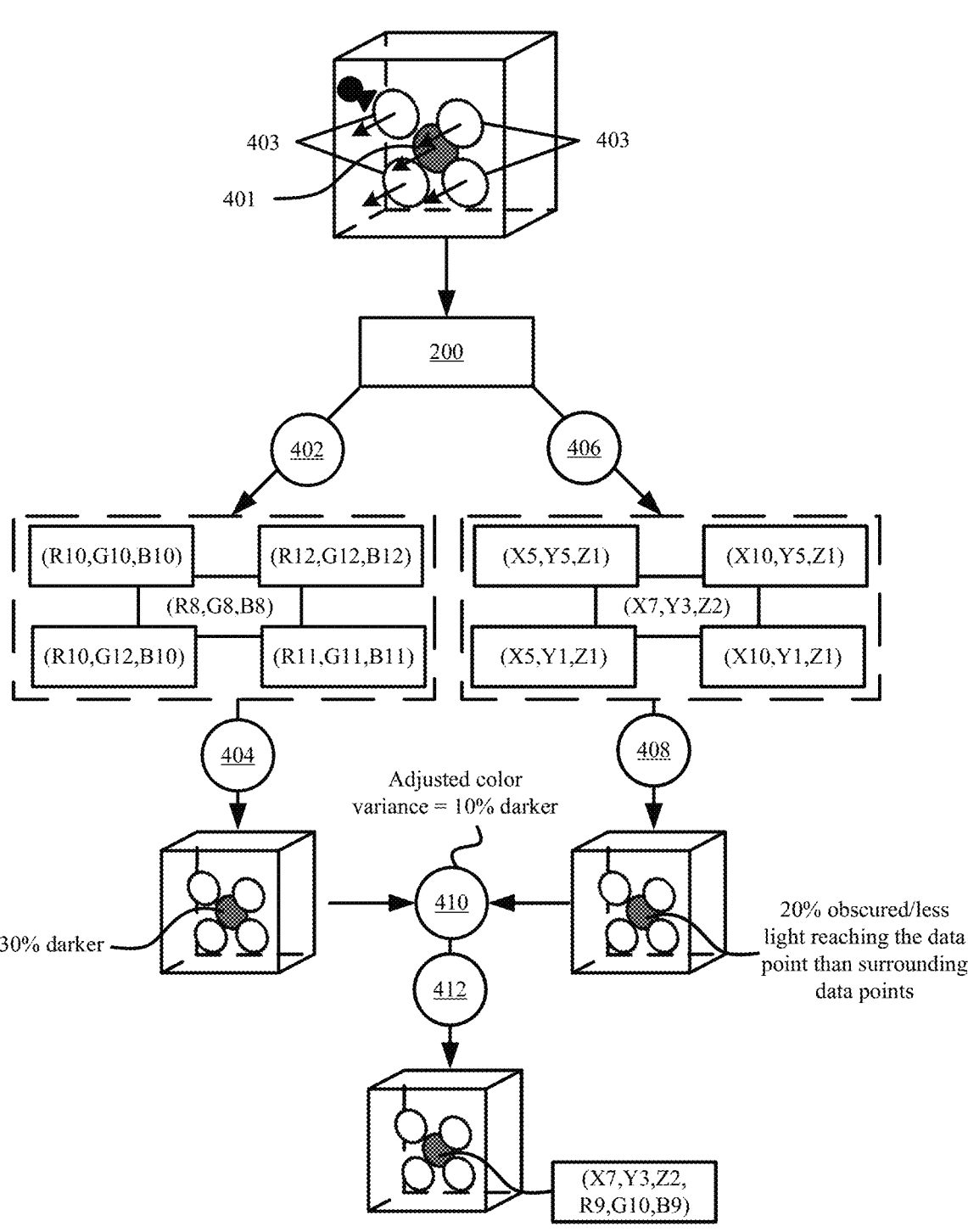
FIG. 4 illustrates an example of color correcting a data point based on positional factors in accordance with some embodiments presented herein.

FIG. 4 illustrates an example of color correcting a data point based on positional factors in accordance with some embodiments presented herein. 3D imaging system 200 compares (at 402) the non-positional elements of data point 401 to the non-positional elements of surrounding data points 403.

3D imaging system 200 computes (at 404) the color variance between data point 401 and surrounding data points 403. For instance, 3D imaging system 200 determines that the color values of data point 401 are 30% darker than the color values of surrounding data points 403.

3D imaging system 200 compares (at 406) the positional elements of data point 401 and the positional elements of surrounding data points 403 to determine that surrounding data points 403 partially obscure data point 401 and/or the light that reaches data point 401. 3D imaging system 200 calculates (at 408) the light exposure difference between data point 401 and surrounding data points 403.

Based on the calculated light exposure difference, 3D imaging system 200 calculates (at 410) an adjusted color variance. For instance, 3D imaging system 200 calculates (at 408) that data point 401 receives 20% less light than surrounding data points 403, and should therefore have color values that are 20% darker than the color values of surrounding data points 403. However, 3D imaging system 200 calculates (at 404) that data point 401 is 30% darker than surrounding data points 403 leading to an adjusted color variance of 10% after accounting for the positional factors and the different amount of light reaching data point 401.

The adjusted color variance may be due to the angle or position at which the 2D image captures the color values that are assigned to data point 401 and surrounding data points 403. For instance, the camera may be positioned at an angle relative to the point or surface represented by data point 401 such that the camera captures that point or surface with even less light than if the camera was directly aligned with the point or surface and/or the surface normal of data point 401. The adjusted color variance may also be due to the color values from pixels of a first image being mapped to data point 401 and the color values from pixels of a different second image of the same physical object from a different position being mapped to surrounding data points 403.

3D imaging system 200 performs (at 412) the color correction by adjusting the color values of data point 401 according to the adjusted color variance. In this example, data point 401 is determined to be 10% darker than it should be when considering the positional factors. Accordingly, 3D imaging system 200 increases the brightness levels associated with the color values of data point 401 by 10%.

3D imaging system 200 may perform a secondary or different color correction when the color corrected point cloud or 3D object represented by the color corrected point cloud is introduced in a 3D environment with other 3D objects, light sources, and/or other effects. The first color correction produces the color corrected point cloud by ensuring that the color of the 3D object or the color across the data points of the point cloud are normalized relative to each other. Once the 3D object of the color corrected point cloud is introduced with other 3D objects, the color of the 3D object may be inaccurately presented relative to the other 3D objects. For instance, the 3D object may have brighter reds than the other 3D objects or may not be color corrected for reflections shining off the other 3D objects, and thereby appear out-of-place or irregular amongst the other 3D objects.

FIG. 5 presents a process 500 for color correcting a 3D object that is introduced into a 3D environment in accordance with some embodiments presented herein. Process 500 is implemented by 3D imaging system 200.

Process 500 includes inserting (at 502) a point cloud representing a particular 3D object in a 3D environment with one or more other 3D objects or a background that may change the visualization of the particular 3D object. 3D imaging system 200 may receive input that imports the particular 3D object into the 3D environment and that further adjusts the position, size, orientation, and/or other positional properties of the particular 3D object.

It is assumed that 3D imaging system 200 has color corrected the other 3D objects relative to one another and/or the background as each 3D object is introduced into the 3D environment. In other words, when a second 3D object is added to a first 3D object in the 3D environment, 3D imaging system 200 color corrects the first and second 3D objects relative to one another. When a third 3D object is added in the 3D environment, 3D imaging system 200 color corrects the third 3D object relative to the color corrected first and second 3D objects. Additionally, 3D imaging system 200 may color correct the first, second, and third 3D objects relative to the background, or may color correct the background relative to the coloring of the 3D objects.

Process 500 includes determining (at 504) color variance between the particular 3D object and the other 3D objects and/or background. For instance, 3D imaging system 200 determines and quantifies the difference in one or more of the red color component, blue color component, green color component, other color components, brightness, saturation, contrast, intensity, lowlights, highlights, and/or other non-positional elements between the particular 3D object and the other 3D objects.

Process 500 includes determining (at 506) environmental factors that contribute to the color variance between the particular 3D object and the other 3D objects. The environmental factors include light sources in the 3D environment, reflectivity of the other 3D objects, transparency of the other 3D objects, lighting obstructions, shadows, and/or other elements or effects in the 3D environment that originate because of the positioning and visual characteristics of the other 3D objects and that may contribute to the color variance. Each light source may illuminate different parts of the particular 3D object with different intensities. The reflectivity of the other 3D objects may cause more or less light and/or certain reflected colors to reach certain parts or sides of the particular 3D object. The transparency of the other 3D objects impacts what color values are filtered and/or how much of the color values are visible. For instance, the particular 3D object may be positioned behind a semi-transparent object that blurs, distorts, or filters a range of color values from one side of the particular 3D object. The environmental factors may also include the impact that the background has on each of the 3D objects. For instance, a darker background may cause each of the 3D objects to be darkened in order to be visually consistent with the background, whereas a brighter background may cause of the 3D objects to be brightened in order to be visually consistent with the background.

Process 500 includes adjusting (at 508) the color variance based on the determined environmental factors. Adjusting (at 508) the color variance includes computing how much the color values of the particular point cloud data points should differ from the color values of the other 3D objects in the 3D environment based on the lighting, shadows, reflections, and/or other environment factors that affect each of the particular point cloud data points differently.

Figure 6:
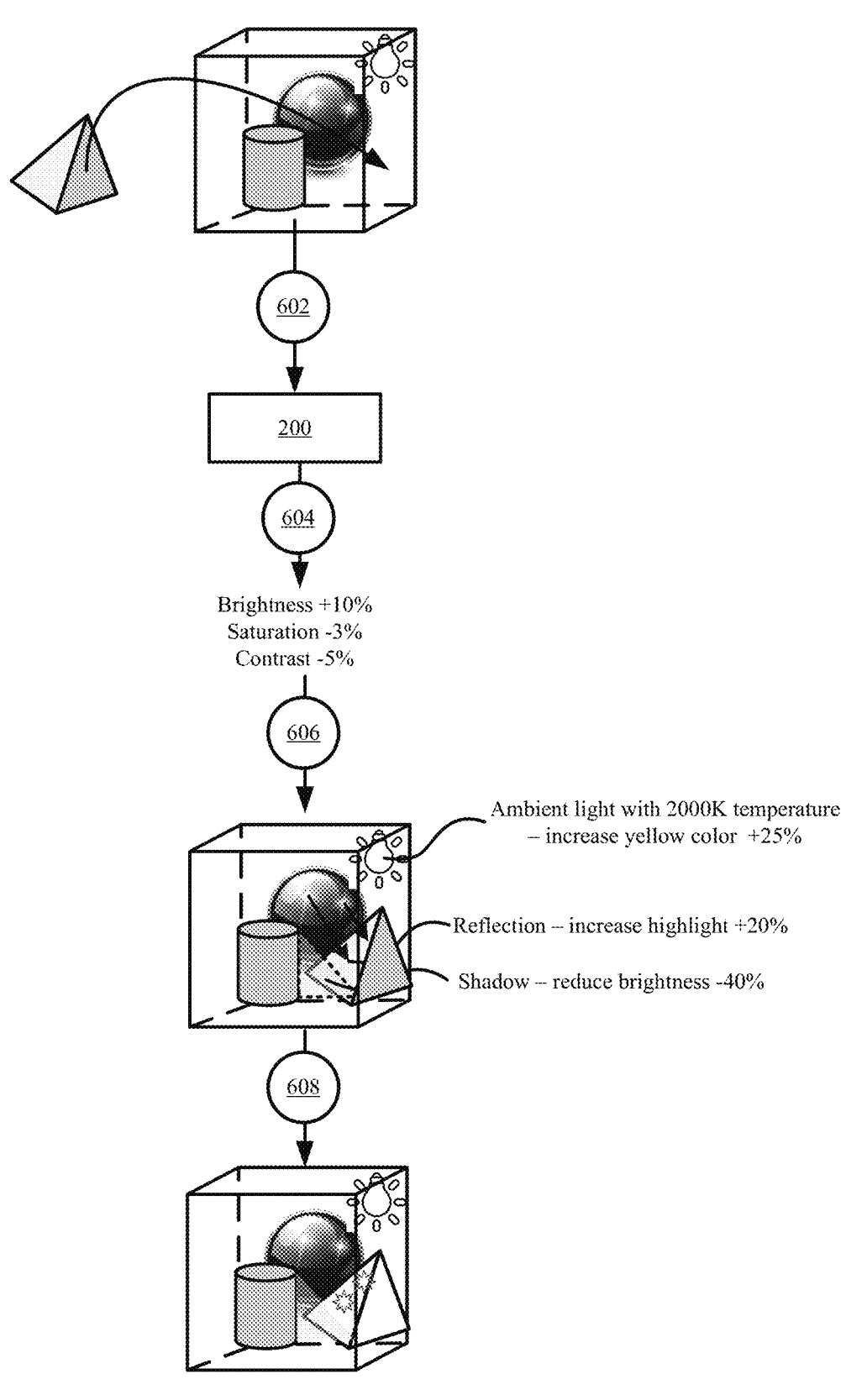
FIG. 6 illustrates an example of color correcting a point cloud based on environmental factors within a 3D environment in accordance with some embodiments presented herein.

Process 500 includes color correcting (at 510) the data points of the particular point cloud based on the adjusted (at 508) color variance that is computed for each data point. FIG. 6 illustrates an example of color correcting a point cloud based on environmental factors within a 3D environment in accordance with some embodiments presented herein.

3D imaging system 200 receives (at 602) input that adds and positions a 3D object in the 3D environment. The 3D object is defined by data points of a point cloud, and the 3D environment includes other 3D objects defined by other point clouds or other 3D file formats.

3D imaging system 200 analyzes (at 604) the positional and non-positional elements of the data points that define the 3D object relative to the positional and non-positional elements of the data points of other 3D objects in the 3D environment in order to compute the color variance between the 3D objects. 3D imaging system 200 also determines (at 606) environmental factors of the other 3D objects and/or light sources in the 3D environment that affect different set of the 3D object data points. For instance, 3D imaging system 200 determines that a surface normal of a first data point in the particular point cloud is aligned with a surface normal of a second data point from another 3D object. 3D imaging system 200 also determines that the second data point is defined with a reflective material property or with a reflective non-positional element. Accordingly, 3D imaging system 200 adjusts the non-positional elements of the first data point based on a computed effect that the reflection of the second data point has on the non-positional elements of the first data point. The reflection may include the brightness of the first data point or change the colors of the first data point depending on the colors of the reflection. In any case, 3D imaging system 200 color corrects (at 608) the non-positional elements of the particular point cloud data points based on the computed color variance and the environmental factors.

Figure 7:
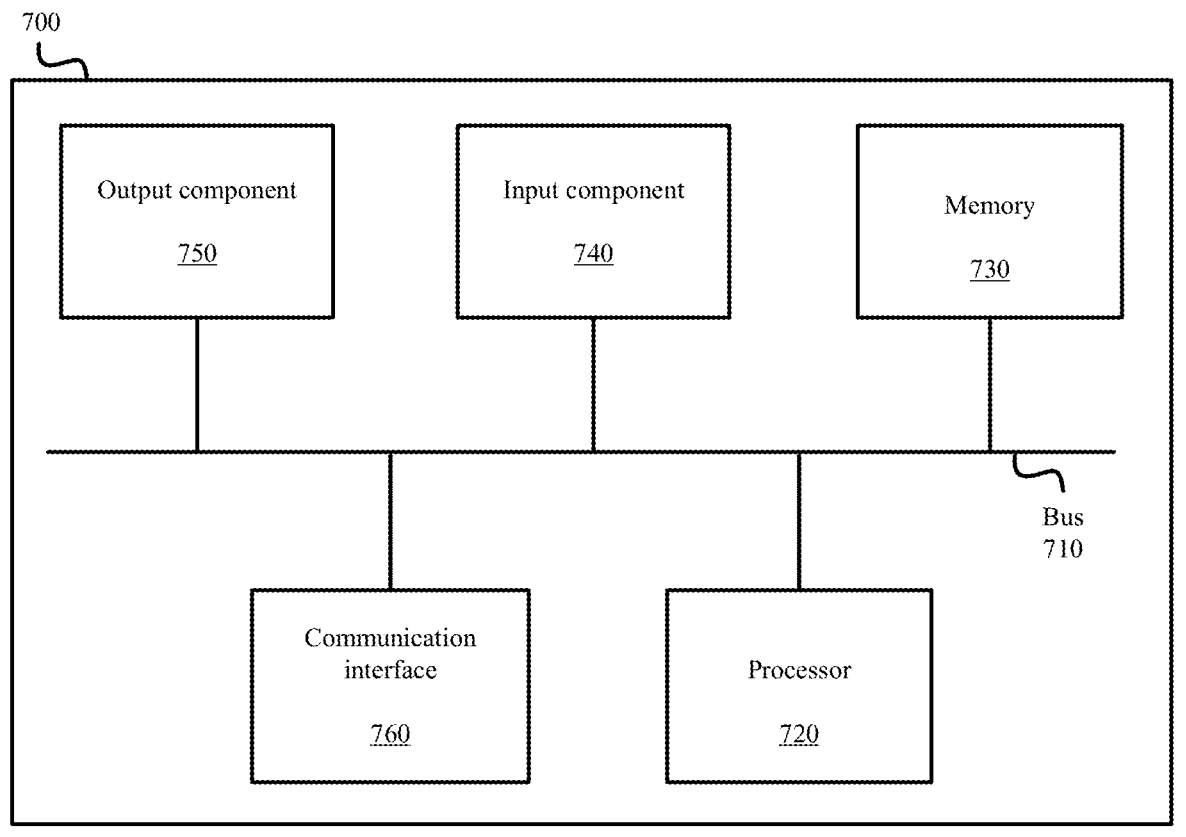
FIG. 7 illustrates example components of one or more devices, according to one or more embodiments described herein.

FIG. 7 is a diagram of example components of device 700. Device 700 may be used to implement one or more of the devices or systems described above (e.g., 3D imaging system 200). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and ano-nymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   positioning a first three-dimensional (3D) object in a 3D environment with at least a second 3D object;
   determining a color variance based on a difference between visual characteristics of the first 3D object and visual characteristics of the second 3D object;
   determining an expected variance between the visual characteristics of the first 3D object and the visual characteristics of the second 3D object; and
   modifying the visual characteristics of the first 3D object based on the color variance differing from the expected variance.

2. The method of claim 1 further comprising:
   determining one or more environmental factors that contribute to the color variance between the visual characteristics of the first 3D object and the visual characteristics of the second 3D object.

3. The method of claim 2, wherein the one or more environmental factors include one or more of light from a light source in the 3D environment that illuminates the first 3D object, a reflection from the second 3D object that reaches the first 3D object, a shadow that is cast on the first 3D object in the 3D environment, and an effect that a background of the 3D environment has on the visual characteristics of the first 3D object.

4. The method of claim 2 further comprising:
   computing the expected variance based on an effect that the one or more environmental factors have on the visual characteristics of the first 3D object.

5. The method of claim 4, wherein modifying the visual characteristics of the first 3D object comprises:
   adjusting the visual characteristics of the first 3D object based on a remaining difference between the visual characteristics of the first 3D object and the second 3D object after accounting for the effect that the one or more environmental factors have on the visual characteristics of the first 3D object.

6. The method of claim 2 further comprising:
   adjusting the visual characteristics of the first 3D object based on different effects that the one or more environmental factors have on the visual characteristics of the first 3D object; and
   wherein determining the expected variance comprises:
      calculating an amount by which the visual characteristics of the first 3D object after said adjusting differ from the visual characteristics of the second 3D object.

7. The method of claim 6, wherein modifying the visual characteristics of the first 3D object comprises:
   color correcting the visual characteristics of the first 3D object based on the amount by which the visual characteristics of the first 3D object after said adjusting differ from the visual characteristics of the second 3D object.

8. The method of claim 1 further comprising:
   adjusting the visual characteristics of the first 3D object based on one or more reflections, shadows, and lights in the 3D environment that affect a presentation of the first 3D object;
   determining an adjusted color variance based on a difference between the visual characteristics of the first 3D object after said adjusting and the visual characteristics of the second 3D object; and
   wherein modifying the visual characteristics of the first 3D object comprises:
      performing a secondary adjustment to the visual characteristics of the first 3D object after said adjusting that corrects for a remaining difference represented by the adjusted color variance.

9. The method of claim 1 further comprising:
   performing a first color correction of the first 3D object prior to positioning the first 3D object in the 3D environment;
   performing a second color correction of the first 3D object after positioning the first 3D object in the 3D environment based on effects that one or more environmental factors of the 3D environment have on the visual characteristics of the first 3D object; and wherein modifying the visual characteristics comprises:

performing a third color correction of the first 3D object based on a remaining color variance between the first 3D object and the second 3D object after performing the second color correction.

10. The method of claim 1, wherein the first 3D object comprises a point cloud with a set of points that form a 3D representation of the first 3D object with each point of the set of points being defined with coordinates for a position about the 3D representation and with color values at that position; and wherein modifying the visual characteristics comprises modifying the color values of each point of the set of points based on an amount by which the color variance differs from the expected variance.

11. The method of claim 1 further comprising:

generating a color corrected visualization of the 3D environment by rendering the second 3D object and by rendering the first 3D object with the visual characteristics adjusted according to said modifying.

12. The method of claim 1, wherein determining the expected variance comprises:

determining an amount by which one or more environmental factors of the 3D environment affect the visual characteristics of the first 3D object.

13. The method of claim 12 further comprising:

determining a remaining color variance based on a difference between the color variance and the amount by which one or more environmental factors of the 3D environment affect the visual characteristics of the first 3D object.

14. The method of claim 13, wherein modifying the visual characteristics comprises:

adjusting the visual characteristics of the first 3D object according to the remaining color variance.

15. The method of claim 1, wherein determining the color variance comprises:

computing one or more of a difference in brightness, contrast, saturation, color ranges, highlights, and lowlights between the first 3D object and the second 3D object.

16. A system comprising:

one or more hardware processors configured to:

position a first three-dimensional (3D) object in a 3D environment with at least a second 3D object;

determine a color variance based on a difference between visual characteristics of the first 3D object and visual characteristics of the second 3D object;

determine an expected variance between the visual characteristics of the first 3D object and the visual characteristics of the second 3D object; and modify the visual characteristics of the first 3D object based on the color variance differing from the expected variance.

17. The system of claim 16, wherein the one or more hardware processors are further configured to:

determine one or more environmental factors that contribute to the color variance between the visual characteristics of the first 3D object and the visual characteristics of the second 3D object.

18. The system of claim 17, wherein the one or more environmental factors include one or more of light from a light source in the 3D environment that illuminates the first 3D object, a reflection from the second 3D object that reaches the first 3D object, a shadow that is cast on the first 3D object in the 3D environment, and an effect that a background of the 3D environment has on the visual characteristics of the first 3D object.

19. The system of claim 17, wherein the one or more hardware processors are further configured to:

compute the expected variance based on an effect that the one or more environmental factors have on the visual characteristics of the first 3D object.

20. A non-transitory computer-readable medium storing program instructions that, when executed by one or more hardware processors of a three-dimensional (3D) imaging system, cause the 3D imaging system to perform operations comprising:

positioning a first 3D object in a 3D environment with at least a second 3D object;

determining a color variance based on a difference between visual characteristics of the first 3D object and visual characteristics of the second 3D object;

determining an expected variance between the visual characteristics of the first 3D object and the visual characteristics of the second 3D object; and modifying the visual characteristics of the first 3D object based on the color variance differing from the expected variance.

* * * * *